C. J. SOLEAU.
AUTOMOBILE LOCK.
APPLICATION FILED AUG. 8, 1919.
1,361,108.
Patented Dec. 7, 1920.
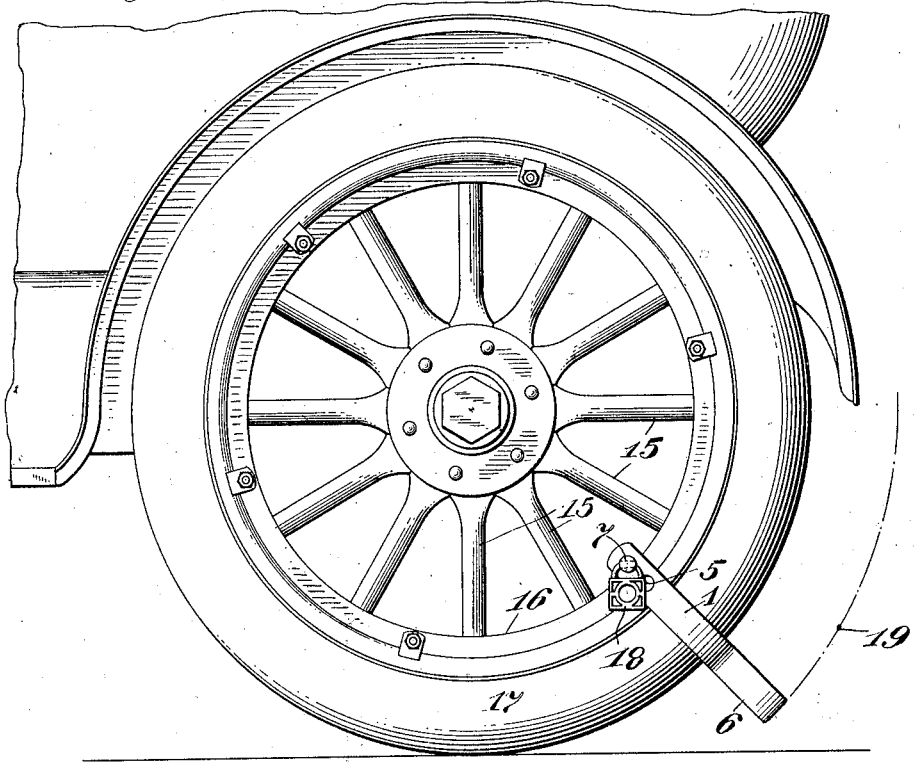
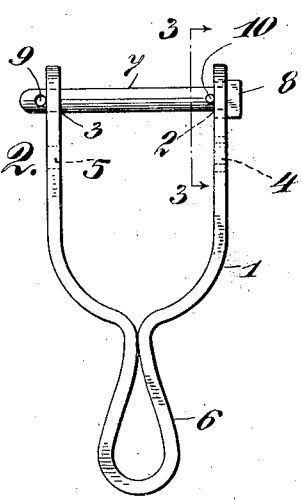
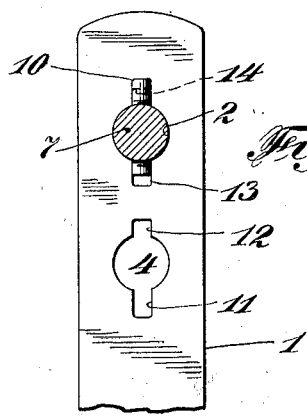
Inventor
Charles J. Soleau
By his Attorney
Lyman E. Dodge

UNITED STATES PATENT OFFICE.

CHARLES J. SOLEAU, OF UPPER MONTCLAIR, NEW JERSEY.

AUTOMOBILE-LOCK.

1,361,108.	Specification of Letters Patent.	Patented Dec. 7, 1920.

Application filed August 8, 1919. Serial No. 316,037.

*To all whom it may concern:*

Be it known that I, CHARLES J. SOLEAU, a resident of Upper Montclair, in the county of Essex and State of New Jersey, have invented a new and useful Automobile-Lock, of which the following is a specification.

This invention relates to locks for wheeled vehicles.

The principal object of this invention is the production of a device of the kind specified which will very greatly hamper one who attempts to steal a vehicle equipped with the device and will also serve to give warning to passers-by that the vehicle being operated has been stolen.

Other objects and advantages will appear as the description of the invention progresses and the novel features of the invention will be particularly pointed out in the appended claim.

In describing the invention in detail, reference is had to the accompanying drawing, wherein I have illustrated a preferred physical embodiment of my invention, and wherein like characters of reference designate corresponding parts throughout the several views, and in which:

Figure 1, is a side elevational view of a fragment of an ordinay automobile with my improvement attached thereto; Fig. 2 is a plan view of my lock; Fig. 3 is a detail fragmentary view of the line 3—3 of Fig. 2 illustrating a feature of my lock.

Referring to Fig. 2, numeral 1 designates a flat bar which has been bent into the shape as shown, forming a substantially U shaped member and what is substantially a projection 6, on the rounded portion of the U. Each leg of the U has holes formed therein 2, 3, 4 and 5, the holes 2 and 4 being shown clearly in Fig. 3 and hole 5 being shown clearly in Fig. 1.

The holes are adapted to receive a bolt 7, having a head 8 resting against one side of a leg, of the U, and having a hole 9 formed in the other end adapted to receive the bolt of a padlock or other suitable means for preventing the bolt 7 being withdrawn from the holes in the legs of the U.

When the lock is not in use on a vehicle wheel and the padlock is not inserted in hole 9 it is desirable to prevent the ready falling out of the bolt 7 from the holes 2 and 3. This is accomplished by inserting a pin 10 and the bolt 7, which pin extends farther from one side of the bolt than it does from the other as shown in Fig. 3. This pin bears against the side of the U and so prevents the bolt from falling out. Of course, the bolt must be at times removed. In order to permit removal the legs of the U adjacent the holes 2, and 4 are slotted as at 11, 12, 13 and 14. These slots are of unequal length, however, as 11 and 13 are longer than 12 and 14 so that not only must the pin 10 be brought into alinement with the slots but the end of pin 10 extending the farthest from bolt 7 must be brought over the slot 11 or 13 according to whether the bolt 7 is in hole 4 or 2.

Fig. 1 shows a fragment of an automobile, which I have selected as a suitable wheeled vehicle for illustrating the application for my lock. This automobile has a wheel having spokes 15, a rim 16 and a tire or shoe 17.

In placing my lock upon the wheel the bolt 7 is first removed from the holes in the legs of the U and then the lock is slipped over the tire or shoe as shown by Fig. 1 with the projection 6 extending outwardly from the tire or shoe. The bolt 7 is then replaced in the holes in the legs of the U so that the lock embraces the tire or shoe as shown by Fig. 1 with the projection 6 extending outwardly from the tie or shoe. The bolt 7 is then replaced in the legs of the U so that the lock embraces the tire or shoe and the rim 16, then the bolt of the padlock 18 is inserted in the hole 9 in the bolt 7 and the operation is complete.

As the size of tires or shoes varies I have provided two sets of holes in the legs of the U. One set is provided at 2 and 3, and the other set at 4 and 5 so that the device may be the better enabled to more snugly fit the various sized tires or shoes. If a large tire or shoe is encountered then holes 2 and 3 will be used, if a smaller tire or shoe is encountered then holes 4 and 5 will be used.

If the automobile equipped with this lock is started without first removing the lock the mud guard and running board will be immediately torn off because projection 6 is of such length as shown by broken line 19 that a rotation of the wheel will cause the lock to engage the mud guard and running board. If the vehicle still proceeds the wheel will be lifted off the ground once each revolution presenting a queer motion which will attract passers-by and their attention being attracted they will see the running board and mud guard missing or crumpled and will know that the automobile has been stolen.

I am aware that locks similar to mine have herebefore been suggested but two great objections have existed against them; first, they were complicated and so extremely expensive; second, they were formed with projections corresponding to my projection 6, having a sharp point which injured the roads. Both of these objections are overcome in my device; the device in the main consists simply of a piece of flat metal which enables it to be inexpensively manufactured; and the projection 6 is not formed with a sharp point and so does not injure the roads.

I am not aware that anybody has heretofore suggested a lock which upon starting the vehicle equipped therewith causes the mudguard and running board to be torn away or crumpled. This feature I consider most important, because not only does it cause a most pronounced racket thereby immediately warning those near by that an attempt is being made to steal the automobile but a permanent record apparent to all is made so that any passer by may see at a glance that the automobile has been stolen. These results to be sure may not be effected immediately upon the introduction of the device but in an extremely short time practically everybody would be familiar with the device and its effects so that the object aimed at would be accomplished.

As will be readily seen the use of the lock is not confined to automobiles as it may be applied to any suitable or appropriate vehicle.

Although I have particularly described the construction of one physical embodiment of my invention, and explained the operation and principle thereof, nevertheless, I desire to have it understood that the form selected is merely illustrative, but does not exhaust the possible physical embodiments of the idea of means underlying my invention.

What I claim as new and desire to secure by Letters Patent of the United States, is:

In a wheeled vehicle lock, in combination: a vehicle having a wheel and wheel guard; a substantially U-shaped member encircling the wheel and formed with a projection of such obtuseness that it will not injure a roadway, each leg of the U formed with a plurality of holes, the holes in each leg forming pairs with the holes in the other leg; a bolt for insertion in any one of the pairs of holes, whereby the member is attached to the wheel; means for preventing the bolt from being withdrawn from the holes; said projection extending outwardly therefrom a distance such that upon rotation of the wheel, the wheel guard will be injured and the vehicle will be caused to rise and fall vertically.

CHARLES J. SOLEAU.